July 21, 1936.  E. W. SPEICH  2,048,146

MEANS FOR CATCHING DIRT FROM AGITATOR OPERATING MECHANISM

Filed Feb. 24, 1936

INVENTOR,
Edward W. Speich,
BY
Howard S. Smith.
his ATTORNEY

Patented July 21, 1936

2,048,146

UNITED STATES PATENT OFFICE 2,048,146

MEANS FOR CATCHING DIRT FROM AGITATOR OPERATING MECHANISM

Edward W. Speich, Lima, Ohio

Application February 24, 1936, Serial No. 65,206

4 Claims. (Cl. 259—1)

This invention relates to new and useful improvements in means for catching dirt from agitator operating mechanism.

It is highly desirable to protect vats and tanks for making food products, from particles of dirt and other foreign substances that fall from the overhead agitator operating mechanism. If these foreign particles drop into the milk or other liquid being agitated in the vat or tank, the product such as cheese is not pure from a sanitary standpoint.

For the purpose of catching this dirt and sediment from the overhead chain, gears and other parts of the agitator actuating mechanism, I provide fixed screens that depend from the track structure, and a catch-all pan or disc that is carried by the rotating agitator shaft. These means co-operate to catch all dirt, oil, sediment and other foreign substances that drop from the gears and other moving overhead parts, and which would pollute the food stuffs being made in the vat or tank if they were to fall therein. In the last two years, tests made by government inspectors reveal that a large amount of dirt and sediment gets into food stuffs in this way.

Figure 1:
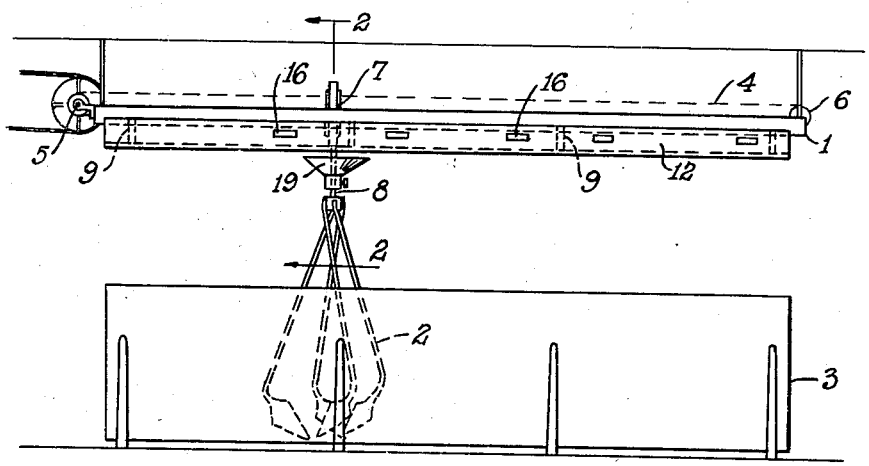
Figure 2:
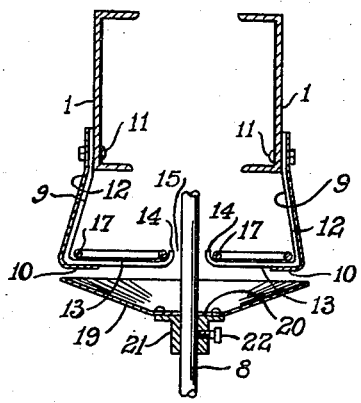
Figure 3:
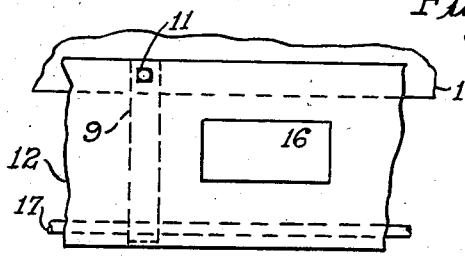
Figure 4:
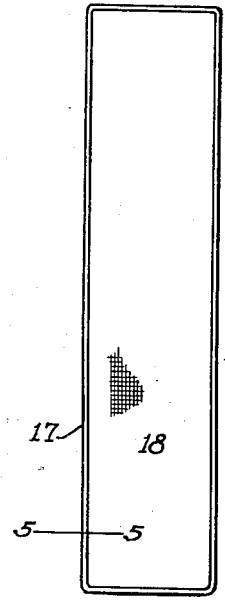
Figure 5:
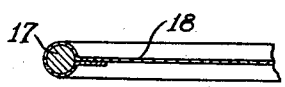

In the accompanying drawing illustrating my invention, Figure 1 is a side-elevational view of a cheese vat and agitator, showing my dirt catching means applied to the overhead track and agitator shaft. Figure 2 is a vertical sectional view taken on the line 2—2 of Figure 1, showing my dirt catching structure. Figure 3 is a partial side view of one of the dirt-screens. Figure 4 is a top plan view of one of the dirt catching screens. And Figure 5 is a cross-sectional view taken through the frame of one of the dirt catching screens, on the line 5—5 of Figure 4.

Referring to the accompanying drawing for a detailed description of one form of embodiment of my invention, the numerals 1, 1 designate the face to face disposed channel rails of an overhead track for an agitator 2 that in this instance operates in a cheese vat 3. Free to pass between the rails is the lower run of an endless actuating chain 4 which is received by pulleys 5 and 6 supported at the ends of the track.

Adapted to travel upon the track rails 1, 1 is a reciprocating agitator gear head 7 from which there depends a vertical shaft 8 carrying the agitator 2. For the purpose of preventing any dirt, grit or other foreign substance dropping from the actuating chain and track into the cheese vat 3, I have provided the following screen structure.

Bolted at intermediate points to the lower exterior portion of each rail 1, are outwardly inclined straps 9. Secured to the lower portions of the rails 1, 1 by the same bolts 11 which attach the straps 9 to them, are sheet metal covers 12 formed with inwardly turned horizontal flanges 10. The straps 9, which are spaced along the entire distance of the track, have horizontal bottom portions 13 that are bent upwardly at their inner ends to provide flanges 14. These flanges 14 define a longitudinal path 15 through which the agitator shaft 8 is free to move from one end of the track to the other. Formed in the metal covers 12 are spaced hand holes 16.

Mounted upon the horizontal bottom portions 13 of the straps 9 are rectangular, fabric-covered wire frames 17 to provide screens to catch dirt and other foreign particles that fall from the chain and track during the longitudinal travel of the agitator head upon the latter. These screens may be easily removed to discharge the particles of foreign matter that lie upon the muslin sheets 18 which cover their frames.

For the purpose of intercepting the downward movement of dirt, oil and other deleterious matter that might drop into the vat 3 from the agitator head 7, I have attached to the shaft 8, below the screens 18, a conical disc 19. This disc has a flat central portion 20 which is riveted to a flanged collar 21 that is adjustably attached to the shaft 8 by a set screw 22. (See Figure 2.) This conical disc, which rotates with the shaft, serves as a catch-all pan for the foreign particles which fall from the agitator head during the operation of the agitator.

It will thus be seen that by the provision of the fixed longitudinal covers and screens, together with the revoluble conical disc 19, I have completely protected the vat 3 against the pollution of its contents through the descent of dirt, oil and other foreign substances therein from the overhead driving chains, track and agitator head.

Having described my invention, I claim:

1. The combination with an agitator gear head, an overhead track therefor, means for reciprocating said head, an agitator shaft projecting downwardly from the latter, a liquid-containing vat, an agitator carried by said shaft for operation in said vat, and screens depending from said rails, and between which said shaft travels from one end of the vat to the other, to catch dirt particles that fall from the overhead moving parts.

2. The combination with an agitator gear head, an over-head track therefor, means for reciprocating said head, an agitator shaft projecting downwardly from the latter, a liquid-containing vat, an agitator carried by said shaft for operation in said vat, straps depending from said rails, and horizontal screens carried by said straps, to catch dirt particles that fall from the over-head moving parts, said screens being spaced apart a sufficient distance to provide a longitudinal path through which the agitator shaft is movable from one end of the vat to the other.

3. The combination with an agitator gear head, an overhead track therefor, means for reciprocating said head, an agitator shaft projecting downwarddly from the latter, a liquid-containing vat, an agitator carried by said shaft for operation in said vat, straps having horizontal bottom portions depending from said rails, said straps being spaced apart at their inner ends to permit the agitator shaft to travel between said ends from one end of the vat to the other, and removable, fabric-covered screens resting upon the bottom portions of the side covers, to catch dirt particles that fall from the overhead moving parts.

4. The combination with an agitator gear head, a pair of channel rails comprising a track therefor, means for reciprocating said head, an agitator shaft projecting downwardly from the latter, a liquid-containing vat, an agitator carried by said shaft for operation in said vat, side covers secured to the lower exterior portions of said rails, straps also secured to the lower exterior portions of said rails, said straps having horizontal bottom portions that are spaced apart to permit the agitator shaft to travel between them from one end of the vat to the other, and removable, fabric-covered screens resting upon the bottom portions of the straps to catch dirt particles that fall from the overhead moving parts.

EDWARD W. SPEICH.